US011673680B2

(12) United States Patent
Eglin et al.

(10) Patent No.: US 11,673,680 B2
(45) Date of Patent: Jun. 13, 2023

(54) METHOD FOR CONTROLLING A HYBRID HELICOPTER IN THE EVENT OF AN ENGINE FAILURE

(71) Applicant: AIRBUS HELICOPTERS, Marignane (FR)

(72) Inventors: Paul Eglin, Roquefort la Bedoule (FR); Remy Huot, Marseilles (FR); Antoine Conroy, Vitrolles (FR)

(73) Assignee: AIRBUS HELICOPTERS, Marignane (FR)

( * ) Notice: Subject to any disclaimer, the term of this patent is extended or adjusted under 35 U.S.C. 154(b) by 294 days.

(21) Appl. No.: 17/111,813

(22) Filed: Dec. 4, 2020

(65) Prior Publication Data
US 2021/0253262 A1    Aug. 19, 2021

(30) Foreign Application Priority Data
Feb. 18, 2020    (FR) ........................... 2001581

(51) Int. Cl.
*B64D 31/06*    (2006.01)
*B64C 27/06*    (2006.01)
(Continued)

(52) U.S. Cl.
CPC .............. *B64D 31/06* (2013.01); *B64C 27/06* (2013.01); *B64C 27/56* (2013.01); *B64D 27/02* (2013.01);
(Continued)

(58) Field of Classification Search
None
See application file for complete search history.

(56) References Cited

U.S. PATENT DOCUMENTS 3,540,680 A    11/1970   Peterson
2006/0269413 A1   11/2006   Cotton et al.
(Continued)

FOREIGN PATENT DOCUMENTS

EP    2148066 A1    1/2010
EP    3201085 A1    8/2017
(Continued)

OTHER PUBLICATIONS

French Search Report for French Application No. FR2001581, Completed by the French Patent Office, dated Oct. 6, 2020, 11 pages.

*Primary Examiner* — Jason H Duger
(74) *Attorney, Agent, or Firm* — Brooks Kushman P.C.

(57) ABSTRACT

The present invention relates to a control method in case of engine failure of a hybrid helicopter having a power plant connected to at least one lift rotor and to at least one propeller, said lift rotor having a plurality of first blades and said at least one propeller having a plurality of second blades. The method comprises the following steps: (i) measuring a forward speed of the hybrid helicopter, (ii) on condition that said forward speed is greater than a first speed threshold and that each engine has failed, automatically implementing a first emergency piloting mode comprising a step for automatic reduction by an automatic piloting system of a pitch of said second blades toward an objective pitch making said at least one propeller produce a motive power which is transmitted to the lift rotor.

14 Claims, 6 Drawing Sheets

(51) Int. Cl.
*B64C 27/56* (2006.01)
*B64D 27/02* (2006.01)
*B64D 31/14* (2006.01)

(52) U.S. Cl.
CPC ........ *B64D 31/14* (2013.01); *B64D 2027/026* (2013.01)

(56) References Cited

U.S. PATENT DOCUMENTS

| | | |
|---|---|---|
| 2010/0013223 A1 | 1/2010 | Certain |
| 2010/0310371 A1 | 12/2010 | Eglin |
| 2016/0083076 A1 | 3/2016 | White et al. |
| 2020/0346744 A1* | 11/2020 | Madeira ................ B64D 31/06 |

FOREIGN PATENT DOCUMENTS

| | | |
|---|---|---|
| FR | 2946315 A1 | 12/2010 |
| WO | 2016053774 A1 | 4/2016 |

* cited by examiner

METHOD FOR CONTROLLING A HYBRID HELICOPTER IN THE EVENT OF AN ENGINE FAILURE

CROSS REFERENCE TO RELATED APPLICATIONS

This application claims foreign priority benefits under 35 U.S.C. § 119(a)-(d) to FR Application 2001581 filed Feb. 18, 2020, which is hereby incorporated by reference in its entirety.

FIELD OF THE INVENTION

The present invention relates to a method of controlling a hybrid helicopter during a failure of each engine of a power plant transmitting power to a lift rotor and to at least one propeller. The present invention also relates to a hybrid helicopter applying this method. The invention lies in the technical field of emergency systems activated in the event of an engine failure.

The project leading to this invention received funding from the European Union's Horizon 2020 research and innovation program, under the CleanSky 2 grant agreement No. "GAM-FRC-2014-001 Issue E.

BACKGROUND OF THE INVENTION

A rotorcraft is an aircraft whose lift is provided totally or partially by at least one rotary wing.

One type of rotorcraft is called a "hybrid helicopter" for convenience because of its specificity, namely because of the presence of at least one rotor and at least one propeller. A hybrid helicopter comprises a fuselage bearing at least one rotary wing provided with a rotor, this rotor being referred to as a "lift rotor" hereinafter for convenience and because of at least one of its functions. The lift rotor participates at least in the lift of the aircraft, or even in its forward movement.

A hybrid helicopter further comprises at least one propeller, possibly of the tractor or pusher propeller type. For example, a hybrid helicopter can be provided with two propellers arranged transversely on either side of the fuselage or with a single propeller.

The hybrid helicopter comprises a power plant transmitting motive power to the lift rotor as well as to the propeller(s) in order to drive them in rotation during normal phases of flight. This power plant comprises at least one engine and a mechanical interconnection system between the lift rotor and the propeller(s). Such a mechanical interconnection system can comprise at least one main power transmission box, a lateral power transmission box by propeller, connection shafts, connection members, etc.

To pilot a hybrid helicopter, a pilot of the hybrid helicopter can operate a first control and a second control to respectively collectively and cyclically control the pitch of the blades of the lift rotor. The first control is referred to for convenience as "collective pitch control" and often takes the form of a lever called "collective pitch lever." The second control is referred to for convenience as "cyclic pitch control" and often takes the form of a so-called "cyclic stick." In addition, the hybrid helicopter includes at least one thrust control which is capable of modifying the pitch of the blades of the propeller(s) collectively and by the same amount. Direction control functions, in particular in yaw, can be performed by using a yaw control. On a hybrid helicopter comprising several propellers, the yaw control can act on the pitch of the propeller blades in order to modify the thrusts exerted by the propellers differently.

Furthermore, the hybrid helicopter can comprise an automatic piloting system. Such an automatic piloting system can comprise actuators mechanically connected to the various blades and an automatic piloting computer. The automatic piloting computer can transmit orders to the actuators so as to automatically control the pitch of the lift rotor blades and the propellers. These actuators can equally well be arranged within the framework of an architecture with mechanical flight controls and within the framework of an architecture with electrical flight controls, for example.

On a conventional helicopter provided with a lift rotor and a tail rotor, when all the engines of the power plant are down, then the pilot operates the flight controls so as to place the aircraft in an autorotation flight phase. An autorotation flight phase corresponds to a particular flight phase in which the aircraft follows a downward trajectory without motive power generated by the engines. In this case, the rotation of the lift rotor is maintained by the air flow passing through the lift rotor, which allows the aircraft to remain maneuverable. The autorotation flight phase allows a safe landing. To this end, the pilot must enter the autorotation flight phase within a very short time by reducing the collective pitch of the lift rotor blades using the aforementioned collective pitch control. Without fast action by the pilot, the speed of rotation of the lift rotor of the aircraft decreases very quickly until this lift rotor stalls.

On a hybrid helicopter, the situation is in fact different due to the presence of the propeller(s).

According to the teaching of document FR 2946315, in the event of autorotation of the lift rotor, and therefore following the reduction in the collective pitch of the blades of the lift rotor, the average pitch of the propellers is placed at the pilot's request at a particular calculated pitch value. This particular calculated pitch value can be set so that the propellers perform only an anti-torque function while consuming minimal power to keep the lift rotor at an acceptable rotational speed.

Therefore, when all of the engines fail, the pilot reduces the collective pitch of the blades of the lift rotor, then actuates a control so that the average pitch of the propellers is forced to a particular value. This procedure is advantageous in making it possible to reduce the high power consumption of the propeller(s). In addition, the collective pitch of the lift rotor blades is adjusted by the pilot so as to keep the speed of rotation of the lift rotor at an acceptable operating speed.

According to one aspect, the decrease in the collective pitch of the lift rotor blades of a hybrid helicopter may tend to generate vibrations and/or high aerodynamic loads on the lift rotor when the aircraft is traveling at high speed.

Document US 2016/0083076 describes an aircraft having at least one lift rotor and one propeller. According to this document US 2016/0083076, following a failure of an engine, the collective pitch of the blades of the lift rotor tends to be reduced rapidly. In the event of an engine failure, a sensor transmits a signal to a flight controller, which then reduces the pitch of the propeller blades. If a pilot does not override this reduction in the propeller blade pitch, the flight controller reduces the propeller blade pitch to a level that is dependent on flight conditions.

Document EP 3201085 describes a rotorcraft comprising two main coaxial rotors. A propeller is located at the rear of the rotorcraft.

Document U.S. Pat. No. 3,540,680 describes a rotorcraft equipped with a main rotor. In addition, the rotorcraft comprises a pair of tail rotors comprising a propeller.

Documents US 2006/269413 and EP 2148066 are also known.

SUMMARY OF THE INVENTION

The object of the present invention is therefore to propose a method tending to limit the vibrations and/or the aerodynamic loads exerted on the lift rotor in the event of total failure of the power plant.

The invention thus relates to a method of controlling a hybrid helicopter, this hybrid helicopter having a power plant connected to at least one lift rotor and to at least one propeller, the power plant having at least one engine, the lift rotor having a plurality of first blades and said at least one propeller having a plurality of second blades.

The method comprises the following steps:

measuring a forward speed of the hybrid helicopter, provided that the forward speed is greater than a first speed threshold and that each engine of said at least one engine has failed, automatically implementing a first emergency piloting mode comprising a step for automatic reduction by an automatic piloting system of a pitch of said second blades up to an objective pitch making said at least one propeller produce a motive power which is transmitted to the lift rotor.

The expression "automatic reduction by an automatic piloting system of a pitch of said second blades" is understood with regard to the value of this pitch before the failure.

The expression "that each engine of said at least one engine has failed" means that when a single engine is present which generates power for driving the lift rotor and the propeller(s), then this single engine has failed and is no longer supplying power. The expression "that each engine of said at least one engine has failed" means that when several engines are present which generate power for driving the lift rotor and the propeller(s), then all of these engines have failed and are no longer supplying power. In order to detect such failures, the method may comprise a step of detecting at least one failure of each engine implemented by a standard monitoring system comprising, for example, one or more engine computers.

Furthermore, the pitch, referred to for convenience as "total pitch," of each second blade may comprise an average pitch component and a differential pitch component. The average pitch component can be controlled by the pilot with a thrust control so as to adjust the forward speed and the differential pitch component can be controlled by the pilot with a yaw control so as to control the hybrid helicopter's yaw movement. For example, on a hybrid helicopter with two propellers located on either side of the fuselage, the total pitch of the blades of one propeller is equal to the sum of the average pitch component and the differential pitch component, while the pitch of the blades of the other propeller is equal to the average pitch component minus the differential pitch component. In fact, the reduction in the average pitch component of each propeller induces a reduction in the total pitch of the second propeller blades.

In this context, the expression "objective pitch" can for example represent, for each propeller, either a value of the total pitch of the second blades of the propeller, or a value of the average pitch component of the total pitch making the propeller a power source and not a power consumer.

In all cases, during a normal phase of flight, each propeller and the main rotor consume power generated by the power plant.

If all engines in the power plant fail, these engines can no longer provide power to either the lift rotor or each propeller.

Therefore, if the forward speed of the hybrid helicopter is greater than a speed threshold, the automatic piloting system automatically applies a first innovative emergency piloting mode. In particular, the automatic piloting system controls actuators to reduce the total pitch or the average pitch component of each propeller to a pitch called "objective pitch" so that each propeller no longer consumes power, but on the contrary supplies motive power to the power plant. Each propeller thus supplies power to the power plant to tend to slow down the speed of rotation of the lift rotor as little as possible. The value of the objective pitch is not necessarily calculated according to the variant, or is not necessarily calculated for regulation purposes.

Surprisingly, the power plant and in particular certain gears of this power plant can in fact be dimensioned to withstand reversible operation of each propeller both in power consuming mode and in power source mode.

By way of illustration, on a hybrid helicopter with two propellers, each propeller can consume a power of 1000 kilowatts except in the event of a breakdown, while the lift rotor can consume 500 kilowatts. When there is a failure of each engine, the automatic piloting system acts on the propellers so that each propeller then produces substantially 250 kilowatts to drive the lift rotor in order to balance the power balance. The power consumed by other elements of the hybrid helicopter has been ignored in this example for educational purposes.

Following a failure of each engine at a given moment, the pilot does not then have to act quickly to reduce the collective pitch of the first blades of the lift rotor, unlike other known solutions, in particular on conventional helicopters. The automatic piloting system acts on its own to modify the pitch of the second blades so that the speed of rotation of the lift rotor does not drop immediately and quickly following the engine failure. The automatic piloting system imposes a low pitch on the second blades so as to make them sources of power in order to drive the lift rotor in place of the failed engine(s). As a result, the lift rotor is not subject to vibrations and/or significant aerodynamic loads resulting from a drop in collective pitch at high forward speed.

Therefore, the pilot can just monitor the speed of rotation of the lift rotor. The pilot's workload is thus reduced. The pilot then has the choice of either gradually decelerating the aircraft without losing altitude until reaching a forward speed allowing the lift rotor to be autorotated without inconvenience, or maintaining a high forward speed by modifying the cyclical pitch of the first blades to dive the hybrid helicopter. The method can thus tend to increase the safety of the flight and to decrease the pilot's workload during an accident phase.

The method can also comprise one or more of the following features.

Optionally, the method may comprise a step for displaying, on a display comprising a pitch scale, an index illustrating a current pitch of the second blades and for example of the average pitch component, another index illustrating a value of a calculated objective pitch or even another index illustrating an average pitch with zero thrust described below According to one aspect, at low forward speed, a second emergency piloting mode distinct from the first emergency piloting mode can be implemented following the failure of one or all of the engines.

Therefore, provided that said forward speed is less than or equal to the first threshold and that each engine of said at least one engine has failed, the method can comprise automatically implementing a second emergency piloting mode comprising the following steps:

automatically adjusting an average pitch component of said pitch of said second blades to an average pitch with zero thrust via the automatic piloting system, said average pitch with zero thrust being calculated by said automatic piloting system so that said at least one propeller exerts no thrust in the absence of a yaw movement order.

Furthermore, the method can comprise, during this second emergency piloting mode, a step of requesting a collective pitch control by a pilot so as to reduce the collective pitch of the first blades.

During this second emergency piloting mode, the collective pitch of the first blades can be reduced because the forward speed is relatively low. For example, the first speed threshold may be of the order of 150 knots, or approximately 277.8 kilometers per hour.

In addition, the average pitch component of the second blades is automatically forced to the average pitch with zero thrust.

A propeller comprising second blades having an average pitch component made equal to an average pitch with zero thrust no longer operates in power source mode. If the differential pitch component is zero, the propeller provides no thrust. The pilot can just modify the differential pitch component to control the yaw movement of the aircraft.

When the objective pitch represents a value of the average pitch component of the propellers, the average pitch with zero thrust is greater than the objective pitch. Likewise, when the objective pitch represents a total pitch value and the differential pitch component is zero, the average pitch with zero thrust is greater than the objective pitch. In other words, to switch from the first emergency piloting mode to the second emergency piloting mode, the average pitch component of the pitch of the second blades is increased.

According to another aspect, during the first emergency piloting mode, said automatic piloting system can determine a value of the objective pitch zeroing out a sum of a mechanical power implemented by said at least one propeller as well as a mechanical power consumed by said lift rotor and a mechanical power consumed by the power plant.

The expression "can determine a value of the objective pitch zeroing out" refers to a value of the objective pitch placing the propeller(s) in an operating point allowing the sum in question to be substantially zero. In other words, when the total pitch or the average pitch component of the second blades reaches the value of the objective pitch, said sum is substantially zero.

The propeller(s) are then for example controlled simply to balance the power balance, namely to supply the power strictly consumed by the other power-consuming units of the aircraft.

Optionally, the mechanical power consumed by the power plant can be equal to the sum of a mechanical power resulting from installation losses and a mechanical power consumed by at least one accessory of the power plant.

For example and according to one possibility s, the method can comprise the determination by said automatic piloting system of said objective pitch by solving the following equation:

$$TCCdesynch = TCCcur - [(PWrp + PWlr + PWinst)/(dPWlr/dTCC)],$$

with "TCCdesynch" which represents said objective pitch, "TCCcur" which represents a current average pitch component of the pitch of the second blades, "PWrp" which represents the mechanical power consumed by said lift rotor, "PWlr" which represents the mechanical power implemented by said at least one propeller, namely by the propeller(s) as appropriate, "PWinst" which represents the mechanical power consumed by the power plant, "/" represents the division sign, "−" represents the subtraction sign, "+" represents the addition sign, "=" represents the equal sign, "dPWlr/dTCC" represents the derivative of the mechanical power consumed by said at least one propeller with respect to the current average pitch component of the second blade pitch.

The value of the current average pitch component TCCcur can be measured in the usual way.

For example, the value of the current average pitch component TCCcur is calculated in a conventional manner by the control computer, for example via at least the current position of the thrust control or even stabilization actuators which are present between the thrust control and the propeller(s).

According to another example and on a hybrid helicopter with two propellers, a first sensor can measure a position of a first control rod for the pitch of the blades of the first propeller, which is the image of the pitch of the blades of the first propeller. Likewise, a second sensor can measure a position of a second control rod for the pitch of the blades of the second propeller, which is the image of the pitch of the blades of the second propeller. For example, each measurement sensor takes the form of an LVDT or RVDT sensor. The value of the current average pitch component TCCcur is then equal to the sum divided by two of the pitch of the blades of the first propeller and of the pitch of the blades of the second propeller.

The value of the mechanical power PWrp consumed by said lift rotor can be calculated, by means of the product of a speed of rotation of a shaft and of a torque exerted on a shaft which are measured in the usual ways or even by a proportionality constant. For example, this shaft can be a rotor mast, or a member which is movable together with the rotor mast at a speed of rotation proportional to the speed of rotation of the rotor mast.

The same is true for the value of the mechanical power implemented by each propeller, namely consumed or produced by each propeller according to the value of the total pitch of the second blades. By convention, this mechanical power can be positive when the propeller consumes mechanical power and negative when the propeller supplies mechanical power to the power plant. The mechanical power PWlr is equal either to the mechanical power implemented by the propeller in the presence of a single propeller, or to the sum of the powers implemented by the propellers if applicable.

The value of the term PWinst of mechanical power consumed by the power plant can be determined in the usual way. For example, this mechanical power consumed by the power plant is equal to the sum of a mechanical power resulting from installation losses PWprt and a mechanical power consumed by accessories PWcons of the power plant. Optionally, the mechanical power resulting from installation losses PWinst is equal to a percentage of the mechanical power consumed by said lift rotor. Optionally, the mechanical power consumed by accessories PWcons can be equal either to a percentage of the mechanical power consumed by said lift rotor, or to a constant established by flight tests.

The value of the term dPWlr/dTCC can be established by calculation from the usual polar curves of the propellers supplying the power PWlr as a function of the average pitch. These curves can be established by flight tests or simulations and can be stored in usual forms, such as a table of values, equations, graphs, etc. For example, in a diagram showing on the abscissa the average pitch of a blade of a propeller at a certain distance from the axis of rotation of the propeller, and on the ordinate the power produced or consumed by the propeller, various curves are plotted, each curve being established for example at a given coefficient of forward movement. Such a coefficient of forward movement may for example be a true air speed or may be equal to a quotient of the true air speed of the hybrid helicopter by the speed of the free end of the blade.

According to one aspect, upon initiation of the first emergency piloting mode, a speed of rotation of the first blades can be kept at a setpoint speed of rotation reached before said failure.

During the first piloting mode, the collective pitch of the first blades of the lift rotor is for example unchanged.

According to another aspect, the control of the propeller (s) can be obtained in various ways.

According to a first embodiment of the control of the propeller(s), during the first emergency piloting mode, said automatic reduction by the automatic piloting system of the pitch of said second blades towards an objective pitch may comprise the following step: slaving of a speed of rotation of the lift rotor at a setpoint speed of rotation by the automatic piloting system by regulating said pitch of said second blades.

The reduction of the pitch of the second blades can be obtained precisely by regulating the speed of rotation of the lift rotor around a setpoint value given by the autopilot, for example by decreasing the average pitch component of the pitch of the second blades of the propellers.

The first embodiment does not require the precise calculation of a value of the objective pitch, since the regulation automatically takes the pitch of the second blades towards this objective pitch. This objective pitch can, however, be calculated for display purposes.

According to a second embodiment of the control of the propeller(s), during the first emergency piloting mode, said automatic reduction by the automatic piloting system of the pitch of said second blades to an objective pitch comprises the following steps: calculating the objective pitch and slaving of the pitch of said second blades to this objective pitch.

According to the second embodiment, the value of the objective pitch is calculated by the automatic piloting system, for example by applying the formula described above: TCCdesynch=TCCcur−[(PWrp+PWlr+PWinst)/(dPWlr/dTCC)]. The automatic piloting system then proceeds to a full authority slaving, for example, of the average pitch component of the second blades on this value of the objective pitch.

According to a third embodiment of the control of the propeller(s), during the first emergency piloting mode, said automatic reduction by the automatic piloting system of the pitch of said second blades to an objective pitch comprises the following steps: calculating the objective pitch and slaving of the pitch of said second blades to a setpoint pitch equal to the objective pitch adjusted as a function of a current speed of rotation of the lift rotor with respect to a setpoint speed of rotation.

Thus, the value of the objective pitch is calculated by the automatic piloting system, for example by applying the formula previously described: TCCdesynch=TCCcur−[(PWrp+PWlr+PWinst)/(dPWlr/dTCC)]. In parallel or before or afterwards, an adjustment variable which is a function of the current speed of rotation of the lift rotor, and for example limited to +/−2 degrees of pitch, is determined. The setpoint pitch serving as the basis for the regulation is then equal to the sum of the objective pitch and of the adjustment variable.

According to another aspect, when the first emergency piloting mode is applied, the method can comprise at least one of the following four disengagement procedures.

According to a first exit procedure, on condition that the first emergency piloting mode is implemented, the method comprises a step in which a pilot addresses a man-machine interface, said man-machine interface emitting a mode change signal which is transmitted to the automatic piloting system, said automatic piloting system applying, following reception of said change signal, a second emergency piloting mode maintaining an average pitch component of the pitch of the second blades equal to an average pitch with zero thrust when the pitch of the second blades reaches the average pitch with zero thrust, said average pitch with zero thrust being calculated by said automatic piloting system so that said at least one propeller exerts no thrust in the absence of a yaw movement order.

The man-machine interface can comprise a known means, such as for example a touch-sensitive surface, a button, a voice command, etc. A crewmember then prompts this man-machine interface to switch directly to the second automatic piloting mode. Even if the optimal conditions are not met for this purpose, the pilot is free to make this choice.

According to a second exit procedure, provided that the first emergency piloting mode is implemented, the method may comprise the following steps:

prompting a collective pitch control by a pilot when said forward speed is less than or equal to the first speed threshold, implementing a second emergency piloting mode via said automatic piloting system keeping an average pitch component of the pitch of the second blades equal to an average pitch with zero thrust when the pitch of the second blades reaches the average pitch with zero thrust, said average pitch with zero thrust being calculated by said automatic piloting system so that said at least one propeller does not exert any thrust in the absence of a yaw movement order.

Optionally, the automatic piloting system can inhibit the collective pitch control as long as the forward speed is greater than the first speed threshold According to this second procedure, the pilot requests a collective pitch control so as to intentionally reduce the collective pitch of the first blades of the lift rotor when the aircraft is below the first speed threshold.

Due to the regulation carried out by the automatic piloting system during the application of the first emergency piloting mode, the pitch of the second blades of the propeller(s) is increased so that the sum of the powers mentioned above remains zero. In particular, the pitch of the second blades of the propeller(s), and for example the average pitch component, is then increased instantly so as to prevent the speed of rotation of the lift rotor from increasing, until the average pitch component of the pitch of the propellers reaches the average pitch with zero thrust previously described. The automatic piloting system then applies the second emergency piloting mode while keeping the average pitch component of the pitch of the second blades of the propellers equal to the average pitch with zero thrust.

The speed of rotation of the lift rotor is then now controlled by the pilot by controlling the collective pitch and the cyclic pitch of the first blades using the collective pitch control and the cyclic pitch control.

According to a third exit procedure, on condition that the first emergency piloting mode is implemented, the method comprises the following steps: comparing said forward speed with a second speed threshold which is lower than the first speed threshold, automatically reducing the pitch of the first blades via the automatic piloting system and implementing a second emergency piloting mode via said automatic piloting system when said forward speed is less than the second speed threshold.

This procedure can in particular be applied in the event that the crew forgets to reduce the collective pitch of the first blades in accordance with the second exit procedure. The second speed threshold can be lower than the first speed threshold, for example of the order of 30 percent and for example of the order of 100 to 120 knots, or of the order of 185 kilometers per hour to 222 kilometers per hour. The first emergency piloting mode is exited automatically by the automatic piloting system when the forward speed drops below a second threshold.

According to a fourth exit procedure, on condition that the first emergency piloting mode is implemented, the method comprises the following steps: detecting a restart of said at least one engine, following said detection, automatically disengaging the first emergency piloting mode by said automatic piloting system.

In the event of a restart of an engine which had previously failed, the automatic piloting system disengages the first emergency piloting mode, for example so as not to come into conflict with a control carried out by an engine computer.

According to another aspect, said aforementioned forward speed can be the true air speed of the hybrid helicopter.

Furthermore, the subject of the invention is also a hybrid helicopter applying this method. The hybrid helicopter comprises a power plant connected to at least one lift rotor and at least one propeller, said power plant having at least one engine, said lift rotor having a plurality of first blades and said at least one propeller having a plurality of second blades. The hybrid helicopter comprises a speed sensor for measuring a forward speed of the hybrid helicopter and an automatic piloting system connected to the speed sensor, said automatic piloting system being configured to apply the method of the invention.

BRIEF DESCRIPTION OF THE DRAWINGS

The invention and its advantages will emerge in more detail in the context of the description which follows with examples given by way of illustration with reference to the appended figures, which show.

DETAILED DESCRIPTION

Elements which are present in several distinct figures are assigned a single reference.

Figure 1:
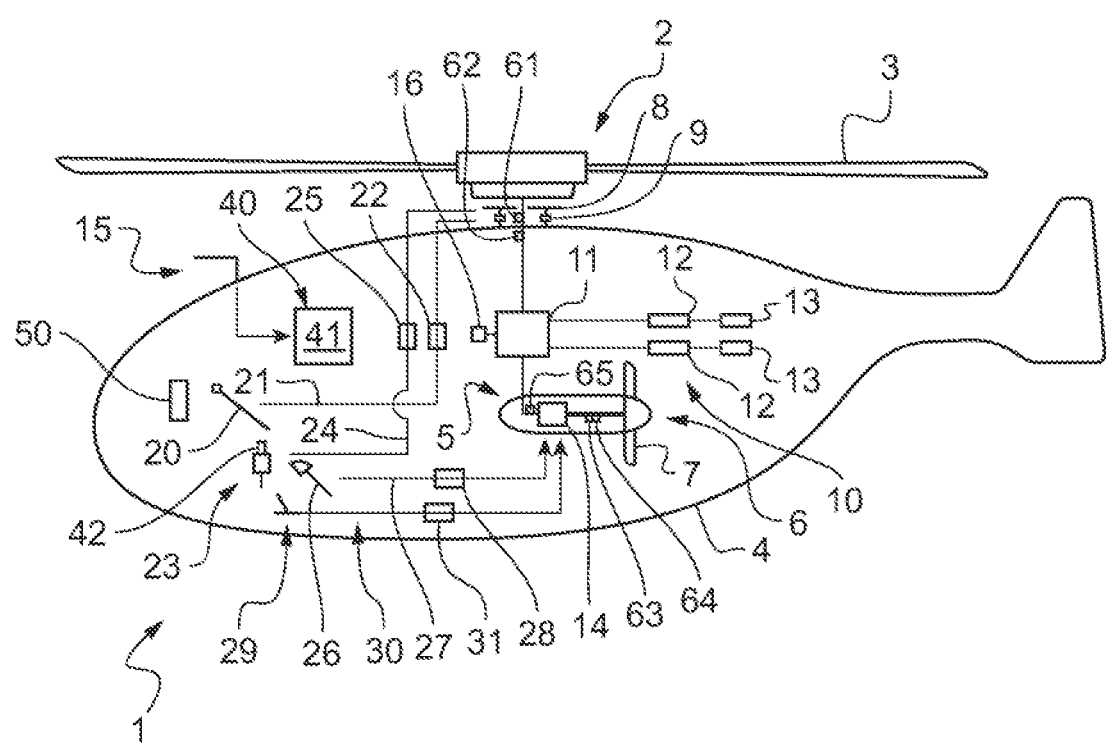
FIG. 1, a schematic view of a hybrid helicopter according to the invention.

FIG. 1 shows an example of a hybrid helicopter 1 according to the invention.

This hybrid helicopter 1 comprises a cell 4 bearing at least one lift rotor 2. This lift rotor 2 is provided with several blades called "first blades 3" for convenience.

In addition, the hybrid helicopter 1 is provided with one propeller 6 or more propellers 6. The expression "each propeller" is sometimes used subsequently whether the aircraft comprises a single propeller or several propellers for the sake of simplicity. The propeller(s) 6 each comprise several blades called "second blades 7" for convenience. The propeller(s) 6 can be arranged laterally with respect to the cell 4, possibly being borne by a support 5. Such a support 5 may optionally be aerodynamic, such as a wing for example. Thus, according to the variant, the hybrid helicopter 1 comprises a single propeller 6 or at least two propellers 6, and possibly at least two propellers 6 arranged laterally, optionally on either side of the cell 4.

Furthermore, the hybrid helicopter 1 comprises a power plant 10 to supply power to the lift rotor 2 and to each propeller 6. This power plant 10 comprises at least one engine 12 for this purpose which is controlled by a standard engine computer 13. Such an engine computer 13 may be able to detect an engine failure by conventional techniques and by means of conventional sensors.

The term "computer" refers hereinafter to a unit which may for example comprise at least one processor and at least one memory, at least one integrated circuit, at least one programmable system, at least one logic circuit, these examples not limiting the scope given to the expression "computer." The term "processor" can denote a central processing unit known by the acronym CPU, a graphics processing unit GPU, a digital unit known by the acronym DSP, a microcontroller, etc.

In addition, the power plant 10 may comprise, for example within an interconnection system, at least one power transmission box 11, 14, at least one shaft, and/or at least one connection member between two rotating parts, etc. For example, one or more engines 12 are mechanically connected by one or more mechanical connecting chains to a main power transmission box 11 which drives the lift rotor 2 in rotation. In addition, the main power transmission box 11 can be mechanically connected by at least one shaft to a lateral power transmission box 14 by propeller, which is therefore in turn connected to a propeller 6.

In addition, the power plant 10 can set various accessories 16 in motion. For example, the main power transmission box 11 can set in motion a pump of a hydraulic circuit.

Furthermore, the hybrid helicopter 1 can comprise various controls to be piloted by a human pilot.

In particular, the hybrid helicopter 1 can comprise a system for collectively and cyclically controlling the pitch of the first blades 3. Such a system can for example include a set of swashplates 8. Thus, at each instant, the pitch of the first blades 3 can be equal to the sum of an identical collective pitch for all the first blades 3 and of a cyclic pitch which varies as a function of the azimuth of each first blade 3.

Consequently, the hybrid helicopter 1 can comprise a collective pitch control 20 which acts on a mechanical and/or electrical control chain 21 to collectively vary the pitch of the first blades 3, optionally via the set of swashplates 8. Likewise, the hybrid helicopter 1 can comprise a cyclic pitch control 23 which acts on one or more mechanical and/or electrical control chains 24 to cyclically vary the pitch of the first blades 3, optionally via the set of swashplates 8.

Usually, the hybrid helicopter 1 can comprise a system for controlling the pitch of the second blades 7. At each instant, the pitch of the second blades 7 of a propeller 6 can be equal to the sum of an average pitch component and of a differential pitch component or to the difference of this average pitch component and of the differential pitch component.

Usually, the hybrid helicopter 1 may comprise a thrust control 26 which acts on one or more mechanical and/or electrical control chains 27 in order to vary the average pitch component of the pitch of the second blades 3 in order for example to pilot a forward speed of the hybrid helicopter 1. Likewise, the hybrid helicopter 1 may comprise a yaw control 29 which acts on one or more mechanical and/or electrical control chains 30 to vary the differential pitch component of the pitch of the second blades 7 in order for example to pilot a yaw movement of the hybrid helicopter 1.

Reference will be made to the literature to obtain information on such an architecture, and for example to document FR 2946315.

Furthermore, the hybrid helicopter 1 comprises an automatic piloting system 40 for applying the method of the invention. This automatic piloting system 40 can comprise an automatic piloting computer 41.

Further, the automatic piloting system 40 can comprise at least one actuator arranged on one of the various control chains 21, 24, 27, 30 mentioned above so as to control the pitch of the first blades 3 and of the second blades 7. Thus, the automatic piloting computer 40 can be configured to issue commands, for example in the form of an electrical, digital, analog or optical signal, to at least one collective pitch actuator 22 making it possible to collectively modify the pitch of the first blades 3, at least one cyclic pitch actuator 25 making it possible to cyclically modify the pitch of the first blades 3, at least one thrust actuator 28 making it possible to modify the average pitch component of the pitch of the second blades 7 in the same way, and at least one yaw actuator 31 making it possible to modify the differential pitch component of the pitch of the second blades 7.

Furthermore, the automatic piloting system 40 may comprise a man-machine interface 42 in wired or wireless communication, direct or indirect, with the automatic piloting computer 41. Such a man-machine interface 42 can be of the tactile, mobile, sound, etc. type. For example, such a man-machine interface 42 can comprise a button, a microphone, a touch screen, etc.

According to another aspect, the automatic piloting system 40 may comprise a display 50.

Furthermore, the automatic piloting system 40 may comprise or may cooperate with different measurement systems of the hybrid helicopter 1.

Thus, a speed sensor 15 of the hybrid helicopter 1 can be in wired or wireless, direct or indirect communication, for example with the automatic piloting computer 41 to provide information relating to a forward speed of this hybrid helicopter 1. For example, the speed sensor 15 is a usual sensor making it possible to determine the true air speed of the hybrid helicopter 1, for example by means of a pressure difference.

In addition, the hybrid helicopter 1 can comprise a first torque meter 61 and a first rotational speed sensor 62 which are arranged on a rotating member and for example a rotor mast of the lift rotor 2 or the like. A computer, or even the automatic piloting computer 41, can be connected to this first torque meter 61 and to this first rotational speed sensor 62 in order to determine a mechanical power PWrp consumed by the lift rotor 2, this mechanical power PWrp consumed by the lift rotor 2 possibly being transmitted to the automatic piloting computer 41 when calculated by another computer. The mechanical power PWrp consumed by the lift rotor 2 can be equal to the product of a speed measured by the first rotational speed sensor 62 and a torque measured by the first torque meter 61 and possibly a coefficient of proportionality depending on the respective locations of the first rotational speed sensor 62 and of the first torque meter 61.

Optionally, the automatic piloting computer 41 can deduce therefrom, in the usual way, a mechanical power PWcons consumed by the accessories 16 and/or a mechanical power PWprt resulting from installation losses. The sum of the mechanical power PWcons consumed by the accessories 16 and the mechanical power PWprt resulting from installation losses gives a mechanical power PWinst consumed by the power plant 10 as such.

In addition, the hybrid helicopter 1 can include at least one second torque meter 63 and at least one second rotational speed sensor 64 per propeller arranged on a rotating member, and for example a shaft of a propeller 6. A computer or even the automatic piloting computer 41 can be connected to this at least one second torque meter 63 and to this at least one second rotational speed sensor 64 so as to determine an intermediate power per propeller 6. Each intermediate power can be equal to the product of a speed measured by a second speed sensor 64 and a torque measured by a second torque meter 63 and possibly a coefficient of proportionality as a function of the respective locations of the second rotational speed sensor 64 and of the second torque meter 63. The sum of the intermediate powers gives a mechanical power PWlr consumed or produced by all of the propellers 6, this mechanical power PWlr consumed or produced by all of the propellers 6 possibly being transmitted to the automatic piloting computer 41 when calculated by another computer.

In addition, sensors can measure information carrying the pitch of the propeller blades. For example, a first sensor 65 can measure information relative to a position of a first control rod for the pitch of the blades of the first propeller, which is the image of the pitch of the blades of the first propeller. Likewise, a second sensor (not shown) can measure a position of a second control rod for the pitch of the blades of the second propeller, which is the image of the pitch of the blades of the second propeller.

Consequently, the automatic piloting computer 41 is configured to apply the method of the invention. For example, at least one processor executes instructions stored in a memory for this purpose.

According to the method, the automatic piloting computer 41 or another computer can calculate an objective pitch using the following relation:

$$TCC\text{desynch} = TCC\text{cur} - [(PWrp + PWlr + PWinst)/(dPWlr/dTCC)],$$

with "TCCdesynch" which represents the value of the objective pitch, more simply called "objective pitch," "TCCcur" which represents a current average pitch component of the pitch of the second blades 7, "PWrp" which represents the mechanical power consumed by said lift rotor 2, "PWlr" which represents the mechanical power implemented by said at least one propeller 6, "PWinst" which represents the mechanical power consumed by the power plant 10, "/" represents the division sign, "−" represents the subtraction sign, "+" represents the addition sign, "=" represents the equal sign, "dPWlr/dTCC" represents the derivative of the mechanical power consumed by said at least one propeller 6 with respect to the current average pitch component of the second blade pitch 7.

The objective pitch TCCdesync can be used for information and/or regulation purposes as explained below. The objective pitch may represent an average pitch component of the pitch of the blades of the propeller(s).

Figure 2:
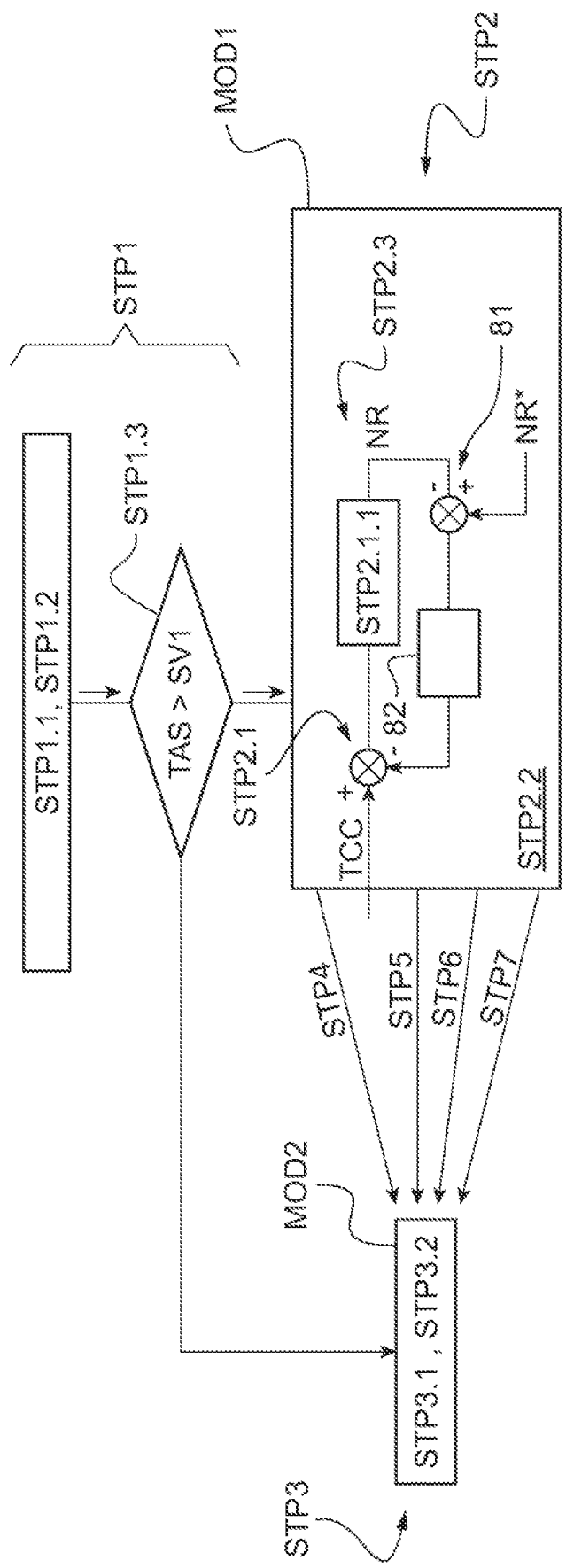
FIG. 2, a view illustrating the method according to a first embodiment.

With reference to FIG. 2 and whatever the embodiment of the invention, the method comprises a step of determining STP1 the current situation.

This step of determining STP1 the current situation comprises a step STP1.1 for measuring the forward speed TAS of the hybrid helicopter 1 with the speed sensor 15 and a step STP1.2 for verifying the correct operation of each engine 12 for example carried out by each engine computer 13. The automatic piloting computer 41 thus receives information carrying the forward speed TAS and one or more information items carrying the operating state of the engines 12.

The automatic piloting computer 41 then implements a step STP1.3 for choosing the emergency piloting mode to possibly be executed.

Thus, if the engine 12 or, if applicable, all of the engines 12 have failed and the forward speed TAS is greater than a first speed threshold SV1, then the automatic piloting computer 41 implements a first emergency piloting mode MOD1 during a step STP2. On the other hand, if the engine 12 or, if applicable, all of the engines 12 have failed and the forward speed TAS is less than or equal to the first speed threshold SV1, then the automatic piloting computer 41 implements a second emergency piloting mode MOD2 during a step STP3.

When the second emergency piloting mode MOD2 is applied, the method comprises an automatic adjustment step STP3.1 during which the automatic piloting system 40 controls at least one thrust actuator 28 so that the average pitch component TCC of the pitch of the second blades 7 is equal to an average pitch with zero thrust TCC0.

This average pitch with zero thrust TCC0 is possibly calculated by the automatic piloting system 40 so that the propeller(s) 6 only exert an anti-torque function in the presence of a yaw movement order given by the pilot.

For example, the average pitch with zero thrust TCC0 is determined using the following relation:

$$TCC0 = cte + \text{Arctg}(TAS/0.75*\text{omega}*R)$$

where "cte" represents a constant, "TAS" represents the true air speed of the hybrid helicopter 1, "omega" represents the speed of rotation of the propellers 6, "R" represents the radius of a circle described by a free end of each second blade 7, "Arctg" represents the arctangent trigonometric function, "/" represents the division sign, "k" represents the multiplication sign, "+" represents the addition sign.

In parallel or even prior to this step, the method can provide for a step of maneuvering by the pilot of the collective pitch control 20 so as to reduce the collective pitch of the first blades 3.

When the first emergency piloting mode MOD1 is applied, during an automatic pitch reduction step STP2.1, the automatic piloting system 40 controls the required actuators to tend to decrease the total pitch or the average pitch component of the total pitch of the second blades 7 making each propeller 6 produce motive power.

The pitch or even the average pitch component reaches an objective pitch which is in fact different from the previous average pitch with zero thrust. The objective pitch may correspond to the value of the total pitch or of the average pitch component to be achieved for each propeller in order to produce power. The objective pitch can correspond to the value of the total pitch or of the average pitch component to be achieved so that the sum of the mechanical power PWlr implemented by the propeller(s) as well as the mechanical power PWrp consumed by the lift rotor 2 and the mechanical power PWinst consumed by the power plant 10 is either substantially zero or: PWlr+PWrp+PWinst=0.

As a reminder, the mechanical power PWinst consumed by the power plant 10 can be equal to the sum of a mechanical power PWprt resulting from installation losses and a mechanical power PWcons consumed by one or more accessories 16, or: PWinst=Pwprt+PWcons.

For example, the automatic piloting system 40 transmits a signal to each thrust actuator 28 to modify the average pitch component of the pitch of the second blades 7.

In addition, neither the pilot nor the automatic piloting system 40 must potentially act on the collective pitch of the first blades 3 in order to keep the lift rotor 2 at a substantially constant speed of rotation.

To establish the signal to be transmitted to each thrust actuator 28 in order to produce the required power with the propeller(s) 6, several embodiments can be envisaged.

According to the first embodiment of FIG. 2, during a step STP2.3, the automatic piloting system 40 slaves the speed of rotation Nr of the lift rotor 2 to a setpoint speed of rotation Nr* by regulating the pitch of the second blades 7 according to a usual regulation loop.

Thus, the automatic piloting computer 41 measures the speed of rotation Nr of the lift rotor 2 during a step STP2.1.1. Then, the automatic piloting computer 41 determines, for example with a comparator 81, an error signal corresponding to the difference between the current rotational speed Nr of the lift rotor 2 and the setpoint rotational speed Nr* aimed at not slowing down the lift rotor 2 following engine failure, if applicable, of the engine(s). The automatic piloting computer 41 can use this error signal in a corrector 82, and for example an integral proportional corrector, to generate an order to reduce the average pitch component of the pitch of the second blades of the propellers 6.

As a result, during the failure, the lift rotor 2 tends to slow down. The regulation described above allows the automatic piloting computer 41 to decrease the pitch of the propellers 6 in order to tend to avoid slowing down the lift rotor 2. The objective pitch is not necessarily calculated according to this embodiment, but can be calculated during a step STP2.2, since the pitch of the second blades is automatically lowered to tend to keep the speed of rotation of the lift rotor constant.

Figure 3:
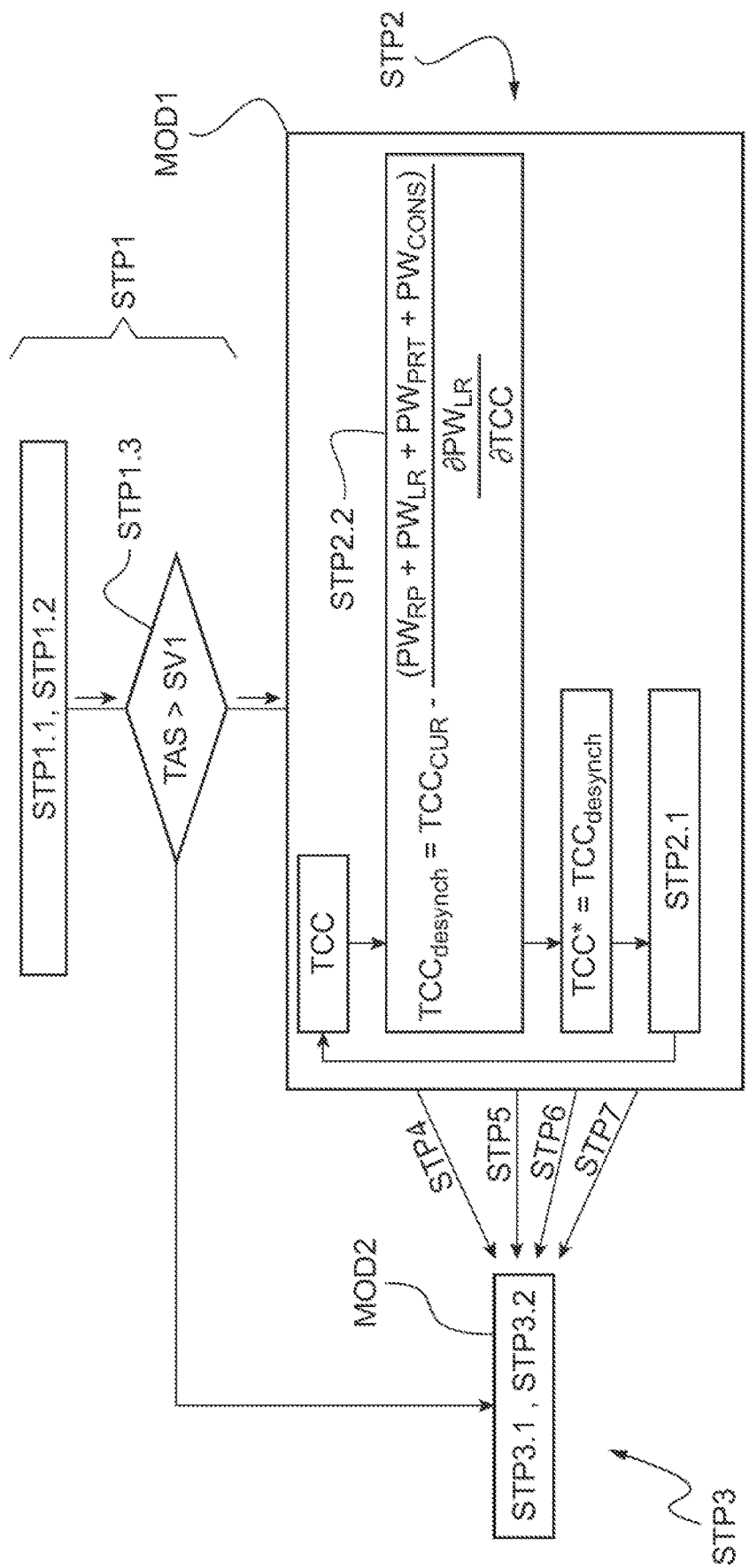
FIG. 3, a view illustrating the method according to a second embodiment.

According to the second embodiment of FIG. 3, the automatic piloting system 40 slaves a pitch of the second blades 7 to a calculated objective pitch.

During an intermediate step STP2.2, the automatic piloting computer 41 determines the objective pitch TCCdesynch, for example by applying the formula described above.

Consequently, this calculated objective pitch TCCdesynch becomes, according to the second embodiment, a TCC* setpoint pitch. During the step for automatically reducing STP2.1 a pitch of the second blades 7, the automatic piloting computer 41 can apply a usual regulation loop which takes into account the setpoint pitch and the current average pitch component TCC of the pitch of the second blades 7 to generate a control signal. This control signal is transmitted to each thrust actuator 28 in order to modify, for example, the average pitch component of the pitch of the second blades of the propellers 2 and to make it tend towards the setpoint pitch.

Figure 4:
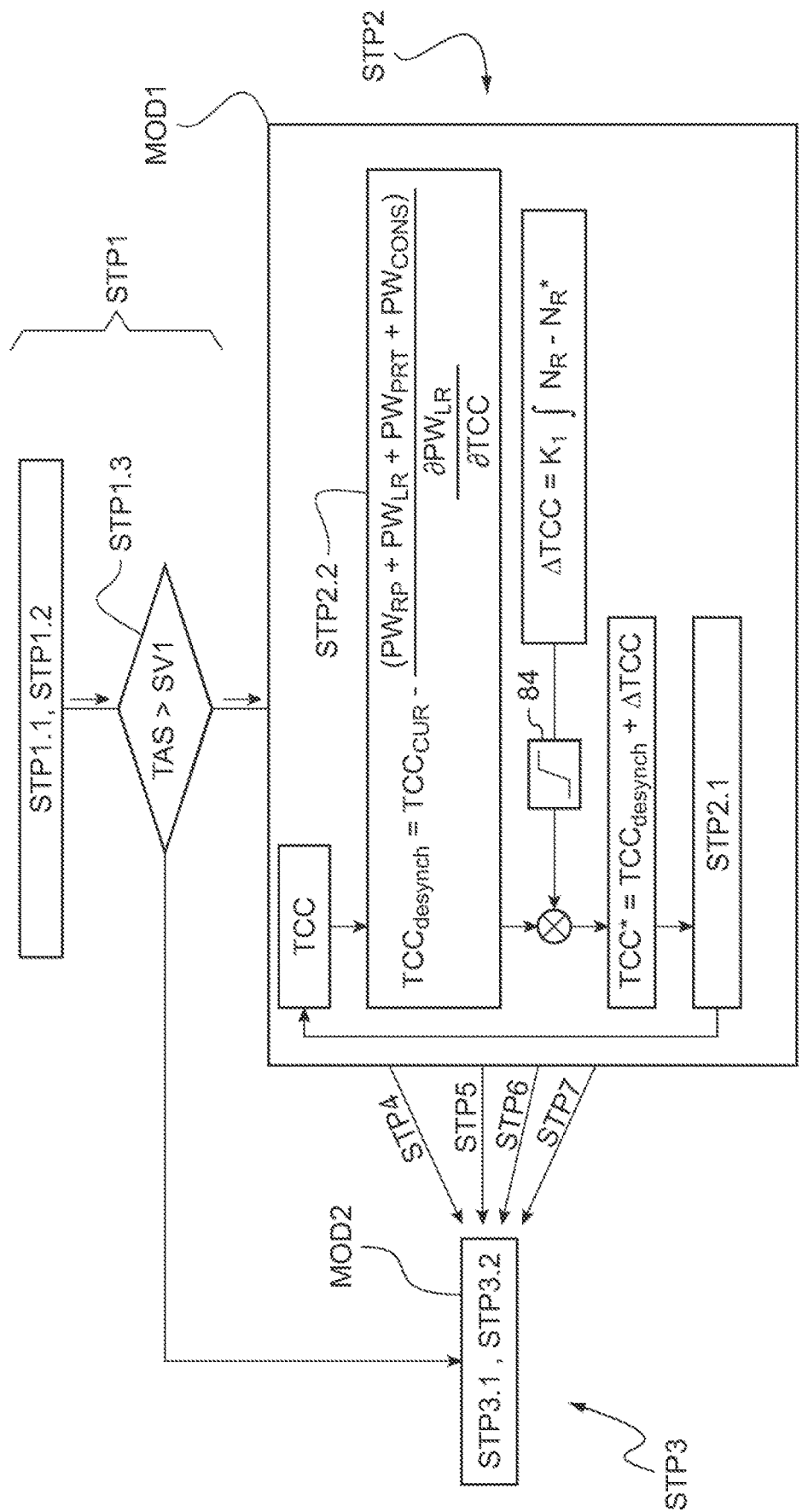
FIG. 4, a view illustrating the method according to a third embodiment.

According to the third embodiment of FIG. 4, the automatic piloting computer 41 determines the objective pitch TCCdesynch.

Compared to the second embodiment, the automatic piloting computer 41 also determines an adjustment value ATCC. This adjustment value ATCC is equal to a stored gain K1 multiplied by the integral of a difference between the current speed of rotation Nr of the lift rotor 2 and the setpoint speed of rotation Nr*. Optionally, this adjustment value is clipped by a limiter 84. Consequently, the setpoint pitch TCC* is equal to the sum of the objective pitch TCCdesynch and of the adjustment value ATCC that may be clipped.

Independently of the embodiment and with reference to FIG. 2, the first control mode MOD1 can be disengaged in different ways.

According to a first exit procedure, the method provides for a step for prompting STP4 of the man-machine interface 42 by a pilot. This man-machine interface 42 transmits, for example, an electrical, digital analog or optical mode change signal which is transmitted to the automatic piloting system 40, and for example to the automatic piloting computer 41. Following receipt of this signal, the automatic piloting system 40 applies the second emergency piloting mode MOD2. Consequently, each propeller 6 is controlled so that the average pitch component of the pitch of these second blades 7 is equal to the average pitch with zero thrust TCC0.

According to a second exit procedure STP5, the pilot operates the collective pitch control 20 when said forward speed TAS is less than or equal to the first speed threshold SV1. Due to the regulation performed, the average pitch component of the pitch of the second blades 7 is increased. The second emergency piloting mode MOD2 is then implemented when the average pitch component of the pitch of the second blades 7 is equal to the average pitch with zero thrust TCC0.

According to a third exit procedure STP6, the automatic piloting computer 41 compares the current forward speed TAS with a second speed threshold SV2. When the forward speed TAS is less than the second speed threshold SV2, the automatic piloting computer 41 automatically reduces the pitch of the first blades 3 and applies the second emergency piloting mode MOD2.

According to a fourth exit procedure STP7, at least one engine 12 is restarted. The engine computer 13 of the restarted engine 12 transmits a signal to the automatic piloting computer 41 to inform it. Consequently, the automatic piloting computer 41 detects the restarting of the engine 12 and automatically disengages the first emergency piloting mode MOD1.

FIGS. 5 to 8 illustrate the progress of the method according to the invention implementing the second exit procedure through a display 50 of the hybrid helicopter 1.

This display 50 can include a graduated scale in pitches 54. The display 50 is controlled by a computer or even by the automatic piloting computer 41 so as to present an index 53 for example showing the current average pitch component of the propeller(s) 6. In addition, the display 50 may have a first mark 51 representing the average pitch with zero thrust and a second mark 52 representing the desynchronization pitch.

Figure 5:
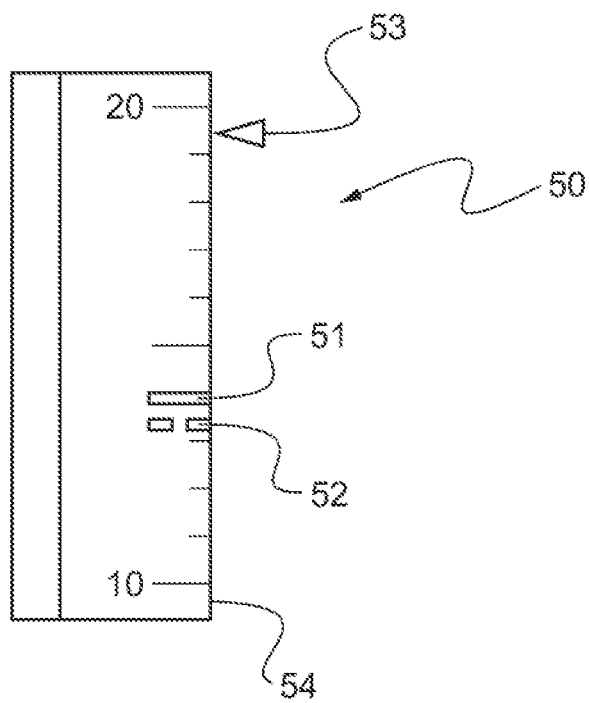
FIG. 5, a view illustrating a display during the application of the method according to the invention before a failure of a power plant, FIG. 6, a view illustrating a display during the application of the method according to the invention during the implementation of the first emergency piloting mode, FIG. 7, a view illustrating a display during the application of the method according to the invention illustrating a passage from the first emergency piloting mode to the second emergency piloting mode, and FIG. 8, a view illustrating a display during the application of the method according to the invention during the implementation of the second emergency piloting mode.

With reference to FIG. 5 and in the absence of failure of each of the engine(s) 12, the current average pitch component of the pitch of the second blades of the propeller(s) 6 is greater than the average pitch with zero thrust, this average pitch with zero thrust being greater than the desynchronization pitch.

Figure 6:
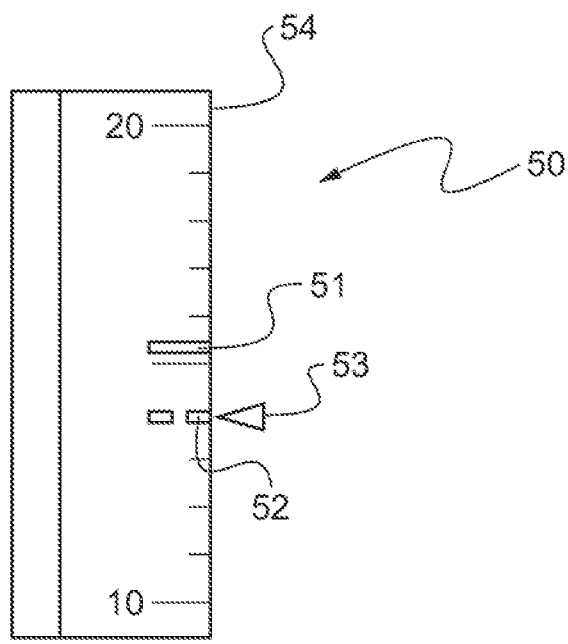

With reference to FIG. 6, following a total failure of each of the engine(s) 12, the automatic piloting system 40 controls the pitches of the second blades of the propeller(s) 6 to make them produce power. The current average pitch component of the pitch of the second blades of the propeller(s) reaches the desynchronization pitch.

Figure 7:
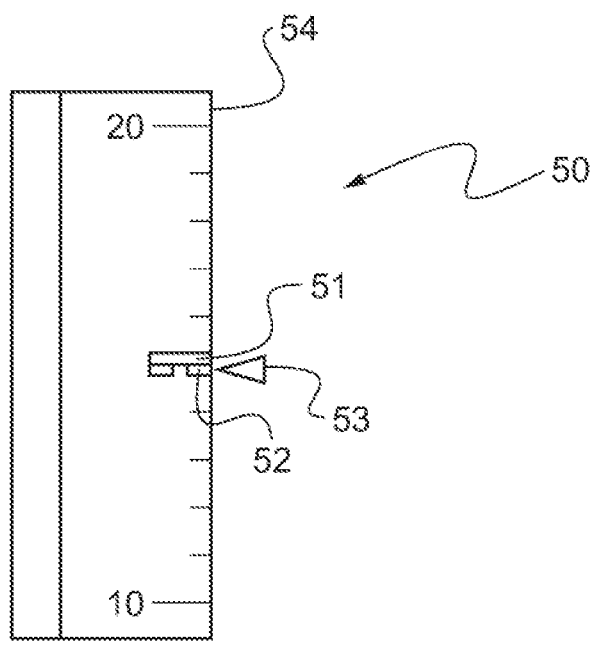

With reference to FIG. 7, when the hybrid helicopter 1 reaches a forward speed below the second speed threshold SV2, the pilot reduces the collective pitch of the first blades 3. This results in an increase in the desynchronization pitch to prevent the speed of rotation of the lift rotor 2 from falling, the current average pitch component of the pitch of the second blades of the propeller(s) 6 remaining equal to the desynchronization pitch.

Figure 8:
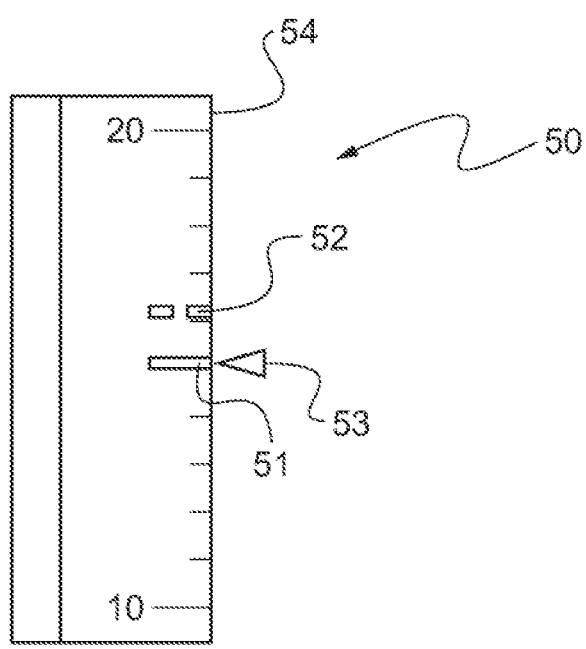

With reference to FIG. 8, the second emergency piloting mode is then engaged, the current average pitch component of the propeller(s) being kept equal to the average pitch with zero thrust.

Of course, the present invention is subject to many variations in its implementation. Although several embodiments have been described, it will be understood that it is not conceivable to exhaustively identify all of the possible modes. It is of course conceivable to replace a described means by an equivalent means without departing from the scope of the present invention.

The invention claimed is:

1. A method of controlling a hybrid helicopter, the hybrid helicopter having a power plant connected to at least one lift rotor and to at least one propeller, the power plant having at least one engine, the lift rotor having a plurality of first blades and the at least one propeller having a plurality of second blades, wherein the method comprises the following steps:
measuring (STP1.1) a forward speed (TAS) of the hybrid helicopter,
provided that (STP1.3) the forward speed (TAS) is greater than a first speed threshold (SV1) and that each engine of the at least one engine has failed, automatically implementing (STP2) a first emergency piloting mode (MOD1) comprising a step for automatic reduction (STP2.1) by an automatic piloting system of a pitch of the second blades up to an objective pitch making the at least one propeller produce a motive power which is transmitted to the lift rotor,
and in that provided that the forward speed (TAS) is less than or equal to the first speed threshold (SV1) and that each engine of the at least one engine has failed, automatically implementing (STP3) a second emergency piloting mode (MOD2) comprising the following steps:

automatically adjusting (STP3.1) an average pitch component (TCC) of the pitch of the second blades to an average pitch with zero thrust (TCC0) via the automatic piloting system, the average pitch with zero thrust (TCC0) being calculated by the automatic piloting system so that the at least one propeller exerts no thrust in the absence of a yaw movement order.

2. The method according to claim 1,
wherein during the first emergency piloting mode (MOD1), the automatic piloting system determines a value of the objective pitch zeroing out a sum of a mechanical power (PWlr) implemented by the at least one propeller as well as a mechanical power (PWrp) consumed by the lift rotor and a mechanical power (PWinst) consumed by the power plant.

3. The method according to claim 2,
said wherein the mechanical power (PWinst) consumed by the power plant can be equal to the sum of a mechanical power (PWprt) resulting from installation losses and a mechanical power (PWcons) consumed by at least one accessory of the power plant.

4. The method according to claim 1,
wherein the method comprises determining, by the automatic piloting system, the objective pitch by solving the following equation:
TCCdesynch=TCCcur−[(PWrp+PWlr+PWinst)/(dPWlr/dTCC)], with "TCCdesynch" which represents the objective pitch, "TCCcur" which represents a current average pitch component of the pitch of the second blades, "PWrp" which represents mechanical power consumed by the lift rotor, "PWlr" which represents the mechanical power implemented by the at least one propeller, "PWinst" which represents the mechanical power consumed by the power plant, "/" represents the division sign, "−" represents the subtraction sign, "+" represents the addition sign, "=" represents the equal sign, "dPWlr/dTCC" represents the derivative of the mechanical power consumed by the propeller with respect to the current average pitch component of the second blade pitch.

5. The method according to claim 1,
wherein, upon initiation of the first emergency piloting mode (MOD1), a speed of rotation of the first blades is kept equal to a setpoint speed of rotation reached before the failure.

6. The method according to claim 1,
wherein, during the first emergency piloting mode (MOD1), the automatic reduction by the automatic piloting system of the pitch of the second blades towards the objective pitch comprises the following step: slaving (STP2.3) of a speed of rotation (Nr) of the lift rotor at a setpoint speed of rotation (Nr*) by the automatic piloting system by regulating the pitch of the second blades.

7. The method according to claim 1,
wherein, during the first emergency piloting mode (MOD1), the automatic reduction by the automatic piloting system of the pitch of the second blades to the objective pitch comprises the following steps: calculating the objective pitch and slaving of the pitch of the second blades to the objective pitch.

8. The method according to claim 1,
wherein, during the first emergency piloting mode (MOD1), the automatic reduction by the automatic piloting system of the pitch of the second blades to the objective pitch comprises the following steps: calculating the objective pitch and slaving of the pitch of the second blades to a setpoint pitch equal to the objective pitch adjusted as a function of a current speed of rotation (Nr) of the lift rotor with respect to a setpoint speed of rotation (Nr*).

9. The method according to claim 1,
wherein, on condition that the first emergency piloting mode (MOD1) is implemented, the method comprises a step (STP4) in which a pilot addresses a man-machine interface, the man-machine interface emitting a mode change signal which is transmitted to the automatic piloting system, the automatic piloting system applying, following reception of the change signal, the second emergency piloting mode (MOD2) maintaining the average pitch component of the pitch of the second blades equal to the average pitch with zero thrust (TCC0) when the pitch of the second blades reaches the average pitch with zero thrust (TCC0).

10. The method according to claim 1, wherein, on condition that the first emergency piloting mode (MOD1) is implemented, the method comprises the following steps:
prompting (STP5) a collective pitch control by a pilot when the forward speed (TAS) is less than or equal to the first speed threshold (SV1),
implementing the second emergency piloting mode (MOD2) via the automatic piloting system keeping the average pitch component of the pitch of the second blades equal to the average pitch with zero thrust (TCC0) when the pitch of the second blades reaches the average pitch with zero thrust (TCC0).

11. The method according to claim 1,
wherein, on condition that the first emergency piloting mode (MOD1) is implemented, the method comprises the following steps (STP6): comparing the forward speed (TAS) with a second speed threshold (SV2) which is lower than the first speed threshold (SV1), automatically reducing a pitch of the first blades via the automatic piloting system and implementing the second emergency piloting mode (MOD2) via the automatic piloting system when the forward speed (TAS) is less than the second speed threshold (SV2).

12. The method according to claim 1,
wherein, on condition that the first emergency piloting mode (MOD1) is implemented, the method comprises the following steps: detecting (STP7) a restart of the at least one engine, following the detection, automatically disengaging the first emergency piloting mode (MOD1) by the automatic piloting system.

13. The method according to claim 1,
wherein the forward speed is true air speed (TAS) of the hybrid helicopter.

14. A hybrid helicopter, the hybrid helicopter having an automatic piloting system being configured to apply the method according to claim 1, the hybrid helicopter having the power plant connected to the at least one lift rotor and to the at least one propeller, the power plant having the at least one engine, the lift rotor having the plurality of first blades and the at least one propeller having the plurality of second blades, wherein the hybrid helicopter comprises a speed sensor for measuring the forward speed (TAS) of the hybrid helicopter and the automatic piloting system connected to the speed sensor.

* * * * *